United States Patent [19]

Schneider

[11] 4,175,874
[45] Nov. 27, 1979

[54] HIGH PRESSURE INJECTION MIXING HEAD FOR MULTI-COMPONENT PLASTICS, PARTICULARLY POLYURETHANE

[75] Inventor: Fritz W. Schneider, Strasslach, Fed. Rep. of Germany

[73] Assignee: Elastogran Maschinenbau GmbH & Co., Munich, Fed. Rep. of Germany

[21] Appl. No.: 823,663

[22] Filed: Aug. 11, 1977

[30] Foreign Application Priority Data

Oct. 12, 1976 [DE] Fed. Rep. of Germany ....... 2645937

[51] Int. Cl.² ............................................. B01F 15/00
[52] U.S. Cl. .................................. 366/182; 425/4 R
[58] Field of Search ................... 425/4; 366/131, 159, 366/177, 182, 189

[56] References Cited

U.S. PATENT DOCUMENTS

| | | | |
|---|---|---|---|
| 3,189,325 | 6/1965 | Levy | 366/182 |
| 4,013,391 | 3/1977 | Boden | 366/159 |
| 4,043,486 | 8/1977 | Wisbey | 366/159 |

*Primary Examiner*—Edward J. McCarthy
*Attorney, Agent, or Firm*—H. Dale Palmatier

[57] ABSTRACT

A high pressure injection mixing head for mixing and ejecting plastic materials consisting of more than one component. The mixing apparatus includes at least two mixing assemblies connected at their outlet ports to a transfer cylinder of a larger diameter. The components are being mixed in the mixing assemblies and then transferred into the transfer cylinder from which the mixture is injected into a mold. The mixing chambers of the mixing assemblies and the cavity of the transfer cylinder are automatically purged when the mixing head ejects material. An entry port for additional material may be located on the transfer cylinder.

6 Claims, 3 Drawing Figures

HIGH PRESSURE INJECTION MIXING HEAD FOR MULTI-COMPONENT PLASTICS, PARTICULARLY POLYURETHANE

The present invention relates to a high pressure injection mixing apparatus for multi-component plastics, particularly polyurethane, whereby this apparatus includes a mixing assembly having a cylindrical mixing chamber in which is adapted to be reciprocated a piston for controlling the flow of the components.

A heretofore known high pressure injection mixing apparatus of the above indicated type includes a piston adapted to perform various functions. Thus, this piston opens and blocks the entry ports for the components into the cylindrical mixing chamber. At the end of a mixing operation, the piston purges the cylindrical mixing chamber by pushing out mixture residues. The piston is also provided with return flow grooves adapted to cooperate with associated feed and return flow bores for continuously recycling the components to their respective reservoirs when the piston is in the inactive or non-mixing position, in order to prevent a disadvantageous separation of components and the like. (For further details, reference may be had to the German Pat. No. 2,007,935).

A factor that substantially affects the mixing in the cylindrical mixing chamber is the high energy of the mutually impinging fluid jets. The mixing is improved and the energy efficiency is more favorable when the entry ports for the components are in close vicinity of each other. When complying with this design requirement, the flow in the mixing chamber is relatively turbulent and will not stabilize up to the outlet of the mixing chamber. For avoiding turbulent splashing jets in the injection of the mixture into a mold, i.e. for stabilizing the fluid jet, there have been employed heretofore complicated mold feedheads intended to smoothly transfer the discharged jet into a mold. Mold feedheads or attachments of this type, however, cannot be purged by the piston as would be the mixing chamber, with the result that these parts must be replaced or dismantled and cleaned separately with the aid of solvents or the like. This at least partly defeats the advantage of self-purging of the mixing chamber by the piston.

It is now the object of the present invention to provide a novel and improved high pressure injection mixing apparatus of a type as stated in the first paragraph of the present specification which mixing apparatus has the advantage of a substantially complete self-cleaning operation but nevertheless discharges a smooth jet of material when injecting material into a mold through simple orifices, in avoiding any splashing of the injected material.

In accordance with the present invention, this object is achieved by providing at least two mixing assemblies with associated outlet ports opening into a larger diameter transfer cylinder, an injector piston slidably disposed in the transfer cylinder, each mixing assembly including a plunger, the axis of which is disposed perpendicularly of the axis of the transfer cylinder, and the mixing assemblies are symmetrically disposed with respect to the transfer cylinder so that the angles between axes of adjacent mixing assemblies are of equal size.

The present invention thus provides an apparatus with at least two conventional mixing assemblies that are connected to a transmitter cylinder of a larger diameter. By this expedient the mixing assemblies may be designed so as to meet the design requirements for achieving a perfect and intimate mixing. In other words, the inlet ports may be in close vicinity of each other so that the components impinge at a high energy. After having been mixed in these mixing chambers, the components enter a transfer cylinder designed for a stabilized discharge jet of material. This transfer cylinder is provided with a piston adapted to block the entry of the mixed components from the individual mixing assemblies and to purge the transfer cylinder, i.e. to expel any left over residue into the mold. The inventive high pressure injection mixing apparatus likewise allows to process relatively large quantities of material within relatively short time periods.

When two mixing assemblies are provided, these assemblies are disposed in an exactly opposing relationship so that the angle included by the axes of these two mixing chambers of the mixing assemblies is 180°. When employing three mixing assemblies, the included angle is 120°. In any case, whether there are provided two, three or more mixing assemblies, the components will always impinge on each other under exactly equal conditions.

Advantageously, the mixing apparatus of the present invention may be of a design wherein the transfer cylinder includes a casing having a transverse bore for admitting filler or additive materials into the cylinder, and this transverse bore is in communication with the transfer cylinder in the mixing position of the ejector piston. This transverse bore allows to incorporate filler or additive materials of very different types. These additive materials may consist of gases such as particularly air for modifying the cellular structure in the manufactured finished product. The additives may likewise consist of liquid and solid fillers such as fiber materials, glass fibers, finely divided granulated materials such as talcum and barium sulfate and the like, for decreasing the proportion of relatively expensive plastic materials in the mixture.

Advantageously, the transverse bore for admitting filler or additive materials may be more remote from the outlet port of the transfer cylinder than the ports of the mixing chambers of the mixing assemblies. With such an arrangement, the filler or additive material may not enter through the transverse bore until a material flow has already been established within the transfer cylinder. When the ejector piston moves into the open position, the transverse bore will be unblocked somewhat later, and when the ejector piston moves into the closing position, the transverse bore will be blocked earlier than the ports of the mixing chambers. This arrangement of the transverse bore ensures an intimate mixing of the additive materials with the already mixed components.

In accordance with a further characteristic of the present invention, the plungers of the mixing assemblies may be provided with conventional return flow bores.

Further advantages and characteristics of the present invention will be described in the following with reference to the appended drawing in which is illustrated an embodiment of a high pressure injection mixing apparatus in accordance with the present invention.

Figure 1:
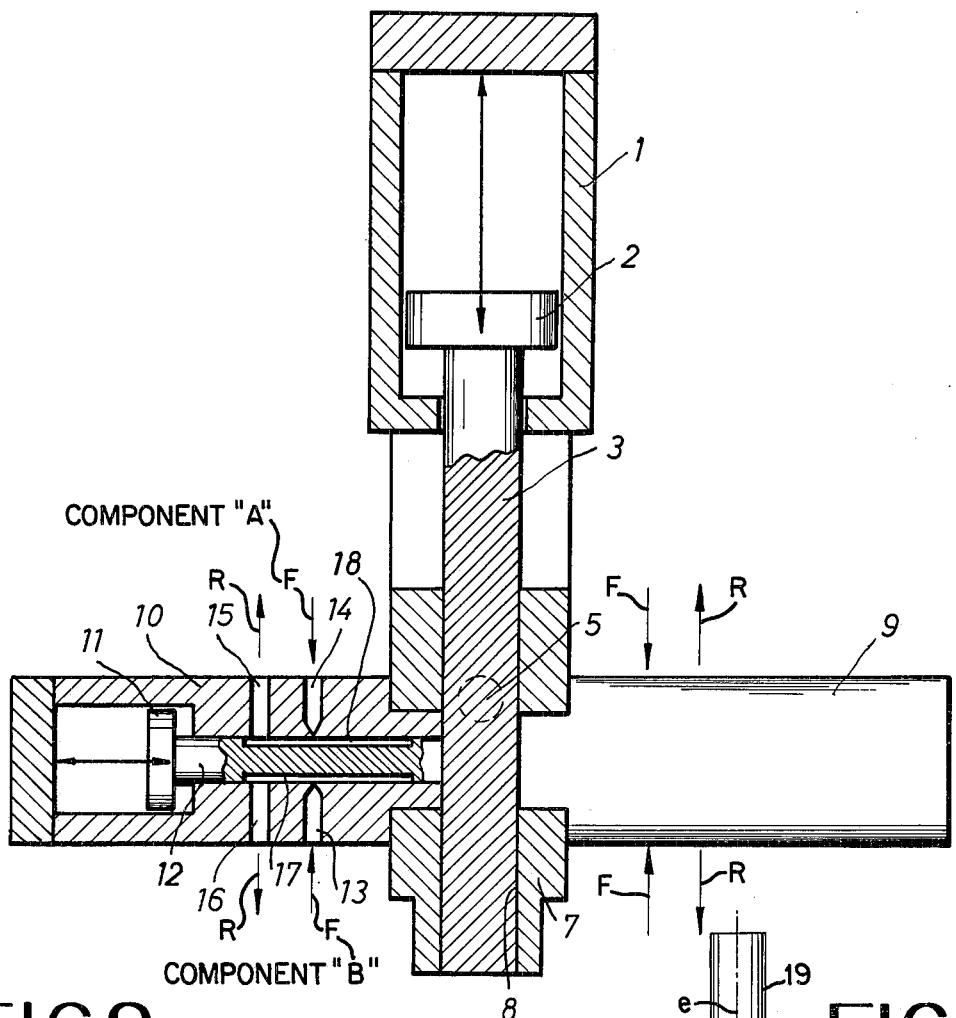
FIG. 1 is a longitudinal and rather schematical sectional view of a high pressure injection mixing apparatus including two mixing assemblies connected to a transfer cylinder.
Figure 2:
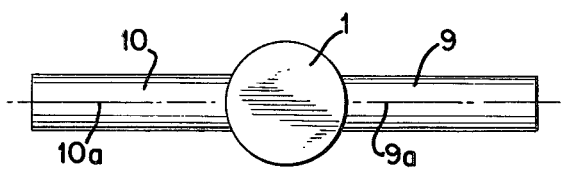
FIG. 2 is a top plan view thereof.

In the casing 7 of a transfer cylinder 8 is adapted to be reciprocated an ejector piston 3. In the drawing, the injector piston 3 is shown in its rest or inactive position. An associated hydraulic piston-cylinder assembly 1, 2 is provided for actuating the ejector piston 3.

The casing 7 of the transfer cylinder 8 includes a transverse bore 5 through which may be supplied a filler or an additive material. In the inactive position of the ejector piston 3 as shown, the transverse bore 5 is blocked by the ejector piston 3.

Two mixing assemblies 9 and 10 are connected to the casing 7 at opposite sides so that the axes of these two mixing assemblies are co-linear. Since the two mixing assemblies 9 and 10 are identical, only the mixing assembly 10 is shown in detail.

In the cylindrical mixing chamber 10.1 of this mixing assembly 10 is provided a plunger or piston 12 adapted to be reciprocated by an associated hydraulic piston-cylinder assembly 11. The plunger 12 is shown in the blocking or return flow position. The axes of the cylindrical mixing chambers 10.1 and pistons 12 of the two mixing assemblies 9 and 10 extend in the same plane and perpendicular to and radially toward the axis of the transfer cylinder 8, and are oriented symmetrically with respect to each other at an angle of 180° with respect to each other.

The casing of the mixing assembly 10 is provided with two feed flow bores 13 and 14 for respectively admitting one of two components A and B (from associated reservoirs not shown). Flow of the components to bores 13 and 14 is indicated by arrows F. The casing is furthermore provided with two corresponding outlet or return flow bores 15 and 16 for returning the components to their respective reservoirs. Return flow of components from 15 and 16 is indicated by arrows R. In the position shown of the plunger 12 the feed flow bore 13 communicates via a longitudinal groove 17 in the plunger 12 with the return flow bore 16, and the feed flow bore 14 in the casing communicates via another longitudinal groove 18 in the plunger 12 with the return flow bore 15.

In the position of the plunger 12 shown, mixture components supplied by pumps from reservoirs (not shown) to the mixing assemblies 9 and 10 will be returned to their respective reservoirs through the return bores and interconnecting lines (not shown).

For initiating a mixing operation, the hydraulic piston-cylinder assemblies 1, 2 and 11 are appropriately actuated. The plunger 12 of the mixing assembly 10, the corresponding plunger of the mixing assembly 9 and the ejector piston 3 of the transfer cylinder are thereby moved into a mixing or active position not shown in the drawing.

The components supplied at a high pressure through the inlet bores 13 and 14 are mixed intimately with each other within the cylindrical mixing chamber of the corresponding mixing assembly 9 or 10. The mixtures thus obtained within the mixing assemblies 9 and 10 will then enter into the transfer cylinder 8 in which the flow of the mixture will be stabilized because of the cross-sectional dimensional relationships. From the transfer cylinder, the mixture may be discharged into a mold in the form of the desired stabilized jet.

If desired, a filler or additive material may be introduced through the transverse bore 5 into the transfer cylinder. When the ejector piston 3 moves into the mixing or active position, the piston will unblock initially the entry ports for the mixed components from the mixing assemblies 9 and 10, and shortly thereafter the transverse bore 5 through which the desired materials may enter. This type of geometrical arrangement ensures a virtually perfect mixing operation. When the ejector piston moves again into its blocking position, the transverse bore 5 will correspondingly be blocked first.

When a mixing operation, i.e. a so-called shot has been terminated, the hydraulic piston-cylinder assemblies are again actuated in the appropriate manner so as to move the plunger back into its illustrated return flow position, in pushing all mixture residue into the transfer cylinder. The ejector piston 3 will then likewise be moved into the position shown in which the piston blocks the entry ports at the transfer cylinder and any remaining mixture residue is pressed into the mold.

Figure 3:
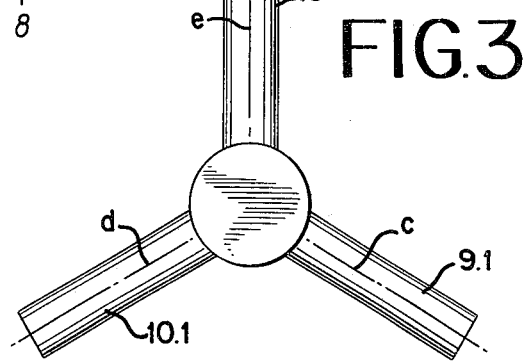
FIG. 3 is a top plan view of an alternate form.

In FIG. 3, the modified form employs three mixing assemblies 9.1, 10.1, and 19.1, which are also symmetrically arranged about the transfer cylinder 8.1 with the axes c, d and e of the cylindrical mixing chambers and pistons of the mixing apparatus arranged at angles of 120° with respect to each other.

The above described and illustrated mixing apparatus may of course be provided with more than two mixing assemblies in a symmetrical arrangement about the transfer cylinder.

What is claimed is:

1. A high pressure mixing and injection apparatus from which mixed multi-component plastics, particularly polyurethane, may be discharged in a stabilized jet, said apparatus including a plurality of mixing assemblies each having a cylindrical mixing chamber with in-feed and return flow port means for the several components and also having piston means slidable in the mixing chamber for controlling the flow of the components and to alternately open the port means to allow mixing of the components in the chamber and close the port means to component flow transversely across the mixing chamber while connecting in-flow and return flow port means for each component, the mixing chambers of the mixing assemblies having outlet ports, a transfer cylinder with a diameter significantly greater than the diameter of the mixing chambers, the outlet ports of the mixing chambers communicating with the transfer cylinder for unobstructed flow, an ejector piston slidably disposed in said transfer cylinder, the axes of said cylindrical mixing chambers and the piston means therein extending perpendicularly of and radially toward the axis of the transfer cylinder and said axes also being symmetrically arranged with respect to each other and in a common plane disposed with respect to the transfer cylinder so that the angles between the adjacent axes of the mixing chambers and piston means of the several mixing assemblies are of substantially equal size, and the transfer cylinder having an open end from which flow of the mixed multi-component plastics is discharged in stable jets.

2. A high pressure injection mixing apparatus for multi-component plastics as defined in claim 1 wherein are provided two mixing assemblies, and the angle between the axes of these mixing assemblies is 180°.

3. A high pressure injection mixing apparatus as defined in claim 1, wherein are provided three mixing assemblies, and the angle between the axes of these mixing assemblies is 120°.

4. A high pressure injection mixing apparatus as defined in claim 1, wherein said transfer cylinder includes a casing having a transverse bore in flow communication with the transfer cylinder for admitting filler or additive materials, said transverse bore being in communication with the transfer cylinder, the ejector piston obstructing the transverse bore and the outlet ports and moving along the transfer cylinder to open the outlet ports of the mixing chambers and the transverse bore.

5. A high pressure injection mixing apparatus as defined in claim 4, wherein said transverse bore is more remote from the open end of the transfer cylinder than the outlet ports of the mixing chamber of said mixing assemblies.

6. A high pressure injection mixing apparatus as defined in claim 1, wherein the piston means of the mixing assemblies include pistons with longitudinal grooves communicating with the in-feed and return port means of the mixing chambers.

* * * * *